United States Patent
Kennedy et al.

(10) Patent No.: US 9,004,465 B2
(45) Date of Patent: Apr. 14, 2015

(54) HELICAL COMPRESSION SPRING FOR AN OIL SCRAPER RING OF A PISTON IN AN INTERNAL COMBUSTION ENGINE AND METHOD FOR COATING A HELICAL COMPRESSION SPRING

(75) Inventors: Marcus Kennedy, Dusseldorf (DE); Han-Rainer Brillert, Burscheid (DE); Michael Zinnabold, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 272 days.

(21) Appl. No.: 13/583,828

(22) PCT Filed: Feb. 17, 2011

(86) PCT No.: PCT/EP2011/052343
§ 371 (c)(1), (2), (4) Date: Feb. 19, 2013

(87) PCT Pub. No.: WO2011/110412
PCT Pub. Date: Sep. 15, 2011

(65) Prior Publication Data
US 2013/0168906 A1    Jul. 4, 2013

(30) Foreign Application Priority Data
Mar. 9, 2010 (DE) .......... 10 2010 002 688

(51) Int. Cl.
*F16F 1/00* (2006.01)
*F16J 9/06* (2006.01)
(Continued)

(52) U.S. Cl.
CPC .............. *F16J 9/061* (2013.01); *C23C 30/005* (2013.01); *F16J 9/26* (2013.01); *C23C 28/044* (2013.01); *C23C 28/046* (2013.01); *C23C 28/42* (2013.01)

(58) Field of Classification Search
CPC .... C23C 16/32; C23C 28/044; C23C 28/046; C23C 28/42; C23C 3/005; F16J 9/26; F16J 9/061; F16F 3/04
USPC .............. 267/70, 71, 166, 275, 286; 428/212, 428/216, 217, 336, 408, 610, 697, 698; 427/249.1, 249.7, 249.14, 249.18, 427/255.11, 402, 419.1, 419.2, 419.7, 588
See application file for complete search history.

(56) References Cited

U.S. PATENT DOCUMENTS 6,033,533 A * 3/2000 Sugiyama et al. ....... 204/192.12
6,228,471 B1 * 5/2001 Neerinck et al. ............. 428/216
(Continued)

FOREIGN PATENT DOCUMENTS

CN 1264432 A 8/2000
DE 3630418 12/1987
(Continued)

OTHER PUBLICATIONS

Weber et al., Hochbelastete kohlenstoffbasierte Mehrschichtsysteme fur die Umformtechnik, Vakuum in Forschung und Praxis 18 (2006) Nr. 3, p. 17, Wiley-VCH Verlag GmbH & Co. KGaA Boschstraβe 12, D-69469 Weinheim.
(Continued)

*Primary Examiner* — Pamela Rodriguez
(74) *Attorney, Agent, or Firm* — Robert L Stearns; Dickinson Wright, PLLC

(57) ABSTRACT

A helical compression spring, preferably of steel, in particular CrSi steel or CrNi steel, comprises a coating which has at least one a-C: H: Me coating or a plurality of layers of CrN (16) and a-C: H: Me coatings (14) alternately. In a method for coating a helical compression spring, preferably of steel, a plurality of layers of CrN and a-C: H: Me coatings are applied alternately.

10 Claims, 1 Drawing Sheet

(51) Int. Cl.
  *C23C 30/00* (2006.01)
  *F16J 9/26* (2006.01)
  *C23C 28/04* (2006.01)
  *C23C 28/00* (2006.01)

(56) References Cited

U.S. PATENT DOCUMENTS

| | | | |
|---|---|---|---|
| 6,372,303 B1 | 4/2002 | Burger et al. | |
| 6,562,445 B2 * | 5/2003 | Iwamura | 428/217 |
| 6,599,400 B2 * | 7/2003 | Strondl et al. | 204/192.15 |
| 6,869,676 B2 * | 3/2005 | Burger et al. | 428/336 |
| 7,537,822 B2 * | 5/2009 | Ishikawa | 428/212 |
| 7,563,509 B2 * | 7/2009 | Chen | 428/408 |
| 7,947,372 B2 * | 5/2011 | Dekempeneer | 428/408 |
| 8,178,213 B2 * | 5/2012 | Werger | 428/610 |
| 2001/0024737 A1 | 9/2001 | Utsumi et al. | |
| 2006/0046060 A1 | 3/2006 | Rorig et al. | |
| 2006/0182895 A1* | 8/2006 | Denul et al. | 427/588 |
| 2008/0136116 A1* | 6/2008 | Sarabanda et al. | 277/443 |

FOREIGN PATENT DOCUMENTS

| | | |
|---|---|---|
| EP | 0759519 B1 | 10/2002 |
| EP | 1717493 B1 | 6/2008 |
| JP | 10-237627 A * | 9/1998 |
| JP | 11-100671 A * | 4/1999 |
| JP | 2003014121 A * | 1/2003 |
| JP | 2007170467 A | 7/2007 |
| JP | 2008509352 A | 3/2008 |
| JP | 2008286354 A | 11/2008 |
| JP | 2009174009 A | 8/2009 |
| WO | 2007020139 A1 | 2/2007 |
| WO | 2007079834 | 7/2007 |
| WO | 2009106201 A1 | 9/2009 |
| WO | 2009121719 A2 | 10/2009 |

OTHER PUBLICATIONS

International Search Report PCT/EP2011/052343 mailed on Jun. 6, 2011.

* cited by examiner

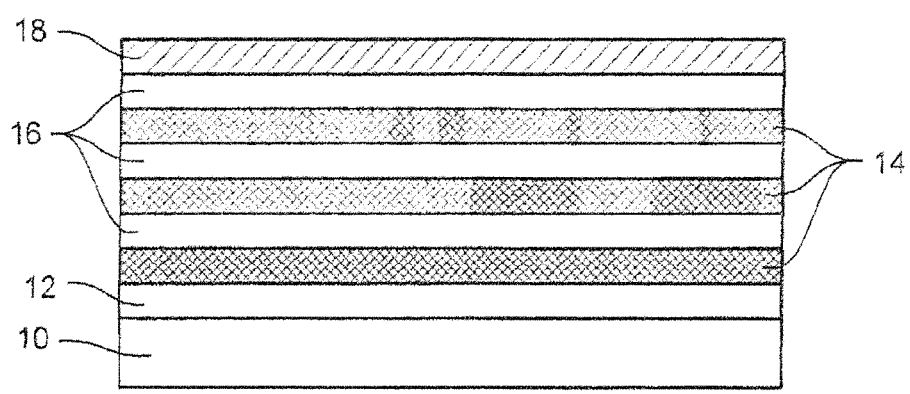

HELICAL COMPRESSION SPRING FOR AN OIL SCRAPER RING OF A PISTON IN AN INTERNAL COMBUSTION ENGINE AND METHOD FOR COATING A HELICAL COMPRESSION SPRING

BACKGROUND OF THE INVENTION

1. Technical Field

The invention relates to a helical compression spring which, as a component of a two-part oil scraper ring in a piston of an internal combustion engine, is provided for pressing the second component of such an oil scraper ring, namely the so-called base body that is in sliding contact with a cylinder or a cylinder liner, against the cylinder wall. The present invention relates further to a method for coating such a helical compression spring.

2. Related Art

As mentioned, in the described two-part oil scraper ring, the helical compression spring is located on the inside of the arrangement, in other words between the base body of the piston ring, which is in sliding contact with the cylinder wall, and the bottom of the piston ring groove. Relative movements occur between the base body and the helical compression spring due to dynamic stress during operation of the engine. This movement can lead to so-called secondary wear, which can manifest itself in the base body in the form of channels in the groove and on the spring in the form of abraded material. The spring can catch in the channels in the groove, which impairs the scraping action of the oil ring. Furthermore, there can be a reduction in the tangential force required to perform the function.

RELATED ART

DE 10 2005 019 500 B4 discloses a helical compression spring which is coated with hydrogen-free iC graphite layers.

SUMMARY OF THE INVENTION AND ADVANTAGES

The object underlying the invention is to provide a helical compression spring and a method for coating it, with which the friction and/or wear and/or running-in behaviour of at least one component of a two-part oil scraper ring is improved.

The coating provided thereon is distinguished by a plurality of alternating plies of CrN and a-C:H:Me layers. Initial tests have shown that both the lifetime and the relative coefficient of friction can be improved by such a layer structure. The lifetime is extended in particular by an improvement in the layer stability. Furthermore, an improved running-in behaviour between the spring and the piston ring could be determined in initial tests.

For the sake of clarity it is mentioned that Me represents metal, and tungsten, chromium, titanium, germanium or silicon, for example, can be used therefor. Both the a-C:H:Me and the a-C:H layer mentioned below are DLC layers and ensure comparatively low wear and good friction properties. In particular, it is assumed that, due to different radial contact pressures and different rates of wear produced thereby, for example over the circumference of a helical compression spring, DLC is nevertheless always present at least on part of the surface, so that the good friction properties, in particular even under conditions of insufficient lubrication, are retained. This is combined in an advantageous manner with advantages offered by the CrN layer as regards wear. The wear resistance of the CrN layer, which is conventionally higher compared with that of DLC, can advantageously become effective from the outset, or when the outermost DLC layer is worn. The described, multi-ply coating additionally offers the advantage that significantly higher overall layer thicknesses can be produced than in the case of conventional DLC coating systems. This is based essentially on the fact that the internal stresses, which are higher in the case of DLC as compared with CrN, can be equalised in the coating as a whole by the CrN plies.

The helical compression spring is preferably made of steel, in particular CrSi or CrNi steel, is wound substantially helically and accordingly has two spring ends which, owing to the largely circular arrangement of the spring, meet without a gap in the fitted or operating state. That point is preferably radially opposite the joint of the piston ring. It should be mentioned that the coating according to the invention can, for example, be applied to the helical compression spring described in DE 10 2005 019 500 B4 instead of the hydrogen-free iC graphite layers described therein. In particular, all the individual features of the helical compression spring described therein belong to the subject-matter of the present application owing to the reference made herein. As described in the referenced document, the oil scraper piston ring can be configured so that it is not closed circumferentially but has a so-called joint, in other words a gap in the circumferential direction. The helical compression spring is configured to be continuous in that region and is preferably coated in the region of the joint and symmetrically thereto with a peripheral angle of from 5° to 60°. In the referenced publication, the above-described angle about the joint of the piston ring is denoted α. On the inside, the piston ring has a groove for receiving the helical compression spring, which groove is preferably approximately semicircular in shape in cross-section. When viewed in the axial direction of the helical compression spring, it is preferably coated on the side facing the piston ring with an angle (β according to the referenced document) of from 5° to 180°, preferably symmetrically to the mid-plane. It should further be mentioned that the applicant filed on the same day an application having the title "Sliding element, in particular a piston ring, and method for coating a sliding element", in which a coating similar to that described herein is provided for a sliding element, in particular a piston ring. All the features of the coating described therein are also applicable to the coating described herein. Furthermore, the piston ring described therein can advantageously be combined in one of the described embodiments with the helical compression spring described herein, and this combination is to be regarded as a subject of the present application. Furthermore, it is possible to apply to the piston ring, in particular to the inner face, the coating that is described in the application "Method for coating at least the inner face of a piston ring, and piston ring" likewise filed by the applicant on the same day.

For the adhesion of the CrN layer to the substrate, that is to say the helical compression spring, preferably made of steel, it has been found to be advantageous to form an adhesive layer of chromium. This can in particular be applied by vapour deposition and preferably has a layer thickness of less than 0.5 µm. 0.01 µm is at present preferred as the minimum layer thickness of the adhesive layer.

For the outermost layer of the helical compression spring according to the invention, which is initially in contact with the piston ring, a metal-free DLC layer, in other words a layer of type a-C:H, is preferred. Such a layer ensures the best possible running-in behaviour. From 0.1 to 5.0 µm has been found to be advantageous as the thickness of this layer. The minimum layer thickness of 0.1 µm is advantageous for good running-in behaviour. The maximum layer thickness is given on the basis of the minimum adhesion, which becomes lower with thicker layers. For the described outermost or top layer, application to both a CrN and an a-C:H:Me layer is conceivable.

For the individual plies of the CrN and a-C:H:Me layer, from 30 nm to 100 nm is preferred. A thickness of more than 30 nm offers the advantage that, when used in series, the testability of the layer structure is ensured.

The overall thickness of the coating is advantageously, in order to ensure good friction behaviour with a good lifetime, from 0.5 to 10 μm. In this connection, the number of individual plies can be, for example, from 10 to 200.

For the hardness of the CrN layer, values of from 800 to 1900 HV 0.002 have been found to be suitable. This form can be combined with a hardness of the metal-free DLC layer of from 1700 to 2900 HV 0.002 and/or a hardness of the metal-containing DLC layer of from 800 to 1600 HV 0.002.

It is further expected that particularly good properties of the DLC layer, in particular of the metal-containing and/or metal-free DLC layer, will be obtained when that layer contains hydrogen.

The metal-containing DLC layer can further advantageously contain nanocrystalline metal or metal carbide depositions, such as, for example, WC, CrC, SiC, GeC or TiC.

The object mentioned above is further achieved by the method described in claim 8.

Advantageously, the described coating can be produced within the context of the method according to the invention by a combination of PVD and PA-CVD processes.

There is further disclosed a combination of at least one helical compression spring described above with a piston ring, which in particular can have the coating described in the above-mentioned application filed in parallel. There is further disclosed the combination of the two-part oil scraper ring so formed with a sliding contact surface, in particular a cylinder or a cylinder liner of an internal combustion engine, in particular of a diesel or turbocharged Otto engine, wherein the sliding contact surface is iron- or aluminium-based.

BRIEF DESCRIPTION OF THE DRAWINGS

A preferred exemplary embodiment of the invention is explained in greater detail below with reference to the drawings.

The FIGURE shows a layer structure according to the invention.

DETAILED DESCRIPTION OF A PREFERRED EXEMPLARY EMBODIMENT OF THE INVENTION

As is apparent from the FIGURE, there is first applied to the base material 10 of the sliding element a chromium adhesive layer 12. A plurality of a-C:H:Me layers 14 and CrN layers 16 are applied alternately thereto from the inside outwards. The outermost layer 18 is formed by an a-C:H layer. In the example shown, that layer 18 is applied to a CrN layer 16, but it can equally be applied to an a-C:H:Me layer 14. Production is preferably carried out by producing the CrN layers 16 by means of PVD, the a-C:H:Me layer 14 by means of PVD and PA-CVD and the a-C:H layer 18 by means of PA-CVD.

The invention claimed is:

1. A helical compression spring for a piston ring, comprising:
   a substrate made of CrSi or CrNi steel, and
   a coating applied to the substrate which has a plurality of alternating CrN layers and a-C:H:Me layers,
   wherein the number of the CrN and a-C:H:Me layers is from 10 to 200, and the CrN and a-C:H:Me layers each have a thickness of from 30 nm to 100 nm.

2. The helical compression spring according to claim 1, including an adhesive layer of chromium beneath the coating.

3. The helical compression spring according to claim 2, wherein the adhesive layer has a thickness of from 0.01 to 0.5 μm.

4. The helical compression spring according to claim 1, wherein an outermost layer of the coating is an a-C:H layer.

5. The helical compression spring according to claim 4, wherein at least one of the a-C:H:Me and a-C:H layers is produced by means of PVD and/or PA-CVD processes.

6. The helical compression spring according to claim 4, wherein the outermost a-C:H layer has a thickness of from 0.1 to 5.0 μm.

7. The helical compression spring according to claim 4, wherein the hardness of the a-C:H layer is from 1700 to 2900 HV 0.002.

8. The helical compression spring according to claim 1, wherein the coating overall has a thickness of from 0.5 to 10 μm.

9. The helical compression spring according to claim 1, wherein the hardness of the CrN layers is from 800 to 1900 HV 0.002.

10. The helical compression spring according to claim 1, wherein the hardness of the a-C:H:Me layers is from 800 to 1600 HV 0.002.

* * * * *